United States Patent

[11] 3,595,471

[72] Inventor Morton Jack Holiday
9180 Ogden St., Thornton, Colo. 80229

[21] Appl. No. 761,218
[22] Filed Sept. 20, 1968
[45] Patented July 27, 1971

[54] CONTROL CIRCUITS FOR THE TAPE PERFORATORS OF A PHOTOCOMPOSING APPARATUS
8 Claims, 15 Drawing Figs.

[52] U.S. Cl. .......... 234/4, 234/125
[51] Int. Cl. .......... B41b 25/10
[50] Field of Search .......... 234/1—12, 125

[56] References Cited

UNITED STATES PATENTS

| | | | |
|---|---|---|---|
| 2,735,491 | 2/1956 | Frost | 234/125 |
| 3,127,098 | 3/1964 | Brewer | 234/125 X |
| 3,234,363 | 2/1966 | Garth, Jr. et al. | 234/8 X |
| 3,244,364 | 4/1966 | Golden | 234/4 |
| 3,258,201 | 6/1966 | Golden | 234/7 X |

*Primary Examiner*—William S. Lawson
*Attorneys*—Van Valkenburgh and Lowe

ABSTRACT: The normal operation of the perforator of a multichannel tape perforator apparatus which code punches a tape from information supplied by a main typewriter keyboard and auxiliary control keyboard is modified by supplemental circuits. A first supplemental circuit includes a two-branch lead extending from a potential source, with one branch to perforator actuators of channels which codes characters and the other branch to perforator actuators of channels which codes spacing information. When both groups of perforators function simultaneously, current flow through the branch lead is balanced. Should the spacing information perforators malfunction, an unbalanced current flow through the branch lead actuates mechanisms to stop the apparatus. A second supplemental circuit includes a holding lead which locks in switches of pulsing leads on channels perforating a given code. Repeated pulses at those channels effect a repetition of the perforation of the given code each time the pulse occurs, and the number of pulses and repeat perforations may be regulated manually with a counter means. A third supplemental circuit is adapted to ground selected channels of the perforator leads to prevent their operation, but to permit continued operation of other channels therein. A fourth supplemental circuit bypasses the power source supplying the perforator leads, and this bypass extends to the perforator leads which code space information to energize such leads without operation of the perforator solenoids therein, to permit operation of the apparatus without operation of the perforators. Finally, an improved connector for interconnecting corresponding branches of multiple networks includes a plurality of plug and socket members, with a network branch at each member.

INVENTOR.
MORTON J. HOLIDAY

BY Van Valkenburgh & Lowe

ATTORNEYS

INVENTOR.
MORTON J. HOLIDAY
BY Van Valsenburgh & Lowe
ATTORNEYS

INVENTOR.
MORTON J. HOLIDAY
BY Van Valkenburgh & Lowe
ATTORNEYS

INVENTOR.
MORTON J. HOLIDAY
BY Van Valkenburgh & Lowe
ATTORNEYS

INVENTOR.
MORTON J. HOLIDAY
BY Van Valkenburgh & Lowe
ATTORNEYS

INVENTOR.
MORTON J. HOLIDAY
BY Van Valkenburgh & Lowe
ATTORNEYS

INVENTOR.
MORTON J. HOLIDAY
BY Van Valkenburgh & Lowe
ATTORNEYS

CONTROL CIRCUITS FOR THE TAPE PERFORATORS OF A PHOTOCOMPOSING APPARATUS

This invention relates to improvements in tape-perforating apparatus for preparing a control tape for phototypographical machines and the like, and more particularly to auxiliary controls for tape perforating apparatus to facilitate the operator in modifying, correcting and controlling the tape as it is being perforated.

The present invention is to improve keyboard tape punching machines of the type disclosed in the U.S. Pat. to Robbins et al., No. 2,848,049 of Aug. 19, 1958 and Donahue, et al., No. 3,056,545 of Oct. 2, 1952. These machines form the first unit of a two-unit photocomposing apparatus and as such, produce perforated, coded control tapes which contain lines of text material and composing instructions therefor, including the selection of characters, line spacing, width and such details referred to as justification, quad right or centering information. The coded control tape may thereupon be used in the second unit of the photocomposing apparatus, such as in photographic machines of the type disclosed in U.S. Pat. to Corrado, et al., No. 2,923,215 of Feb. 2, 1960 and Rossetto, et al., No. 3,106,880 of Oct. 15, 1963. In these machines, the text material, its proper arrangement of lines and spacing as represented by the coded signals on the control tape, is recorded on a sensitized film as latent images. The present invention, however, is not concerned with the use of the control tapes after they are punched and hence, the second unit portions of the apparatus need not be described.

The general operation of a tape-perforating apparatus of the type herein considered is effected through a main keyboard having an array of characters, and one or more auxiliary keyboards having controls which regulate and monitor the manner in which the characters on the main keyboard are to be ultimately printed. The character identification signals and the control signals are reduced to a coded form, a binary code, and the coded signals are thereupon reproduced as perforations in the tape.

Although some types of tape punching machines are quite simple, those used for phototypographical apparatus of the type heretofore referred to are rendered complex by not only the need for reproducing many different characters of varying size and style, but also by the need to control and balance the spacing of the type between the lines. This requires a computer means to keep a running tab on the total width of a line of characters and spaces between them which are being typed, and also, a compensating control means to thereafter adjust the spacing between the words and the letters to balance a line of type with the available line space. This operation, referred to as justification, produces uniform lines of neat appearing, balanced text. All of the instructions for composing and spacing the line of type, as established by the computer means and the compensating control means, are coded on the perforated tape along with the text.

The present invention concerns additional control means for a tape punching machine for phototypographical apparatus which are interposed in the apparatus as auxiliary circuits to function automatically and manually. The tape-punching machine operates smoothly in the normal sequence of coding lines of text; however, it will not allow, warn or compensate for irregularities or mishaps of the circuit operations, nor permit minor irregularities in the composing of lines of text by the operator. For example, an operator may desire to repeat characters, to set a line of text for testing purposes without actually perforating the tape or to even cancel out a certain or all portions of a group of coding symbols on the tape.

It follows that an object of the invention is to provide, in a tape-perforating apparatus, novel, auxiliary circuits within the control circuits which automatically monitor the unison operation of the punch actuating systems of text and line spacing to suspend operations, should certain components of the system fail, and, at the same time, warn the operator that corrective maintenance is required on the machine.

Other objects of the invention are to provide novel auxiliary circuit arrangements in a tape-perforating apparatus which: permit an operator to repeat characters at will; permit the operator to set a line or a portion of a line of text without having the characters coded and punched upon the tape but, at the same time, form the line instructing code punchings; and permit an operator to test set workday without the punching apparatus operating and thereby limit the unnecessary use of the tape and avoid unnecessary operations by the photographic printing unit using the tape.

Another object of the invention is to provide a novel and improved arrangement of auxiliary circuits in a tape-perforating apparatus which will not affect the basic operations of the apparatus, and which are simple, reliable, inexpensive and easily installed.

A further object of the invention is to provide, in an arrangement of auxiliary circuits in a tape perforating apparatus, a be and improved connector construction which permits a technician to quickly and easily interconnect groups of circuit leads with corresponding groups of auxiliary circuit leads.

With the foregoing and other objects in view, all of which will more fully hereinafter appear, my invention comprises certain combinations and arrangements of circuits and components thereof and constructions and combinations of parts and elements, as hereinafter set forth, defined in the appended claims and illustrated in the accompanying drawing in which:

For a better understanding of the components and circuits which constitute the present invention, the circuits and components of the basic conventional tap perforator machine will be first briefly described.

Figure 1:
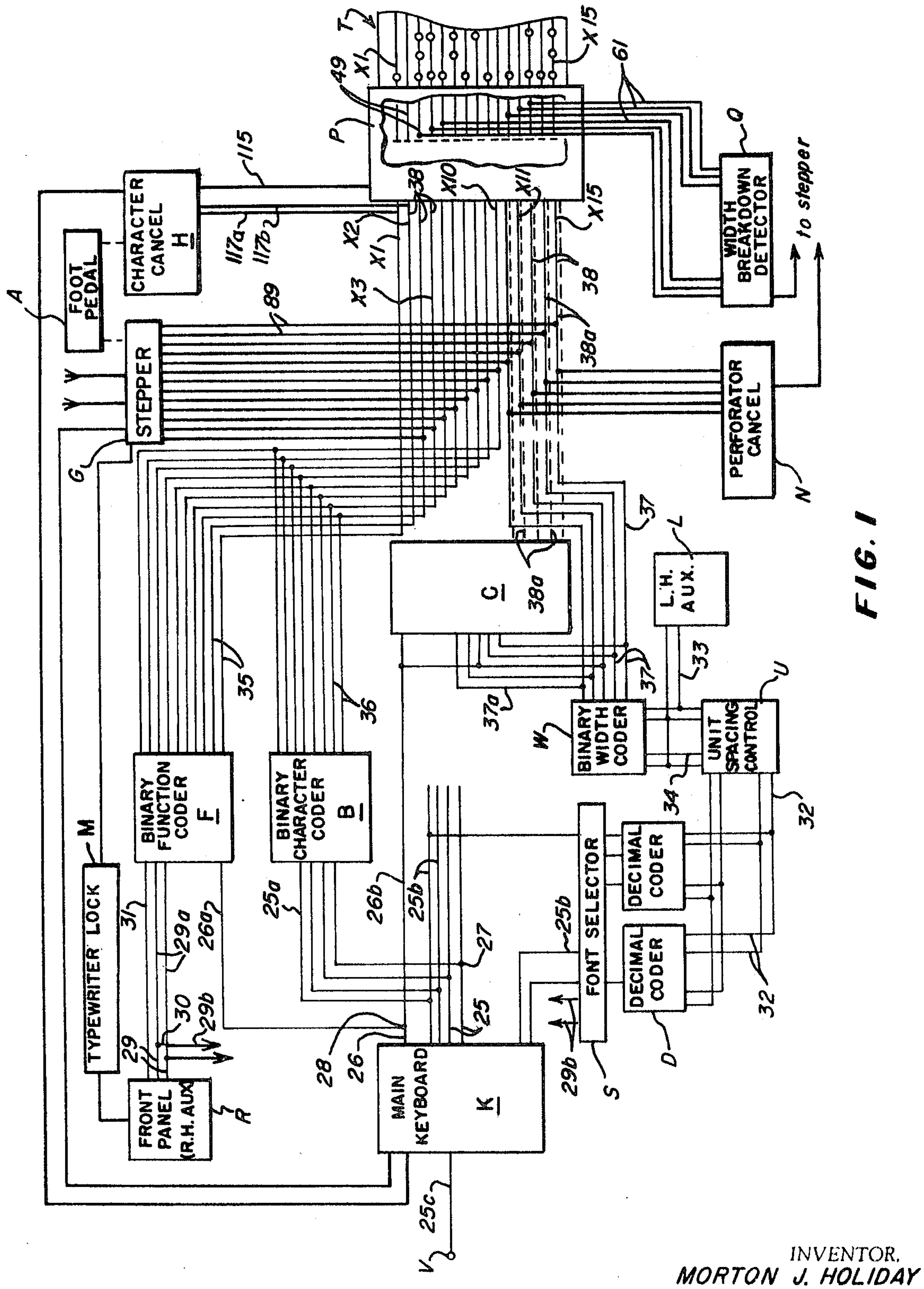
FIG. 1 is a schematic circuit diagram in block form showing the basic control circuitry of a tape perforating machine leading to the perforator, and showing further in weighted lines, those circuit leads which are required to form the auxiliary circuit arrangements for the present invention.

Referring first to FIG. 1, the perforator machine includes a multichannel tape perforator P from whence a coded tape T will extend. The information on this tape is conveyed to the perforator by electrical impulses extending through diverse circuits in the apparatus and which originate by the closing of key switches at an operator's station. Several keyboards are provided for the operator to set in the information and instructions, including a main keyboard K, a left-hand auxiliary keyboard L and a right-hand auxiliary keyboard R. The switches in these keyboards close circuits extending to coding devices and controls which translate the information to binary circuits which, in turn, connect with the tape perforator.

The main keyboard K may be the keyboard of a conventional electrical typewriter arranged with switches at the keys and with leads 25 extending from each switch which are to be energized by the closing of the respective switches. An individual circuit lead 25 extends from each upper case and each lower case character on this main keyboard, requiring as many as 88 individual parallel circuits 25, although the drawing shows only a few of such circuits. Switches for the upper case leads are either on individual keys or are brought into play by the use of a standard typewriter shift key operating a single-pole, double throw switch to shift the character switch from a lowercase lead to an uppercase lead in any suitable manner, not shown. A lead 26 will also extend from this main keyboard which is connected to a switch at the spacer bar of the typewriter and which parallels the leads 25.

Each character lead 25 will divide as at a first junction point 27, and one branch **25*a* of this lead will extend to a binary character identification coder B, while the other branch 25*b* will extend to a font selector S. The lead 26 from the spacer bar divides at a first junction 28, and one branch 26*a* extends to a binary function coder F. The other branch 26*b*** extends to a line-width-indicating computer C.

The right-hand auxiliary keyboard R will conventionally include switch closing keys to select a font of type and circuits 29 extend from these key switches. The circuits 29 branch, as at a junction 30, with one branch **29*a* extending to the binary function coder F and the other branch 29*b* extending to the font selector S. This auxiliary keyboard R will also include other keys for instruction purposes which will extend to the binary function code F, as by circuits which are indicated as circuit 31**.

The font selector S, controlled by signals from the branches **29*b*, will direct the character leads 25*b* to a selected decimal coder D. This coder D will transmit a width indication signal for each character lead 25*b* and for the font of type of the selected coder D. Thus, as the binary function coder F receives instructions as to a selected font of type, through a circuit 29*a*, the coder D, selected by the same circuit 29*b*, will provide instructions as to the width of each character of the selected font set on the main keyboard K, as through the circuits 25*b*. The width instructions are transmitted from the decimal coder D through circuits 32 to a unit spacing control U, wherein adjustments to the standard letter spacing are possible and the left-hand auxiliary keyboard L will include keys from whence circuits 33 extend to the unit spacing control to regulate such spacing. The circuits 33 and other circuits 34** also extend from the unit spacing control U to a binary width coder W.

With the arrangement above described, the three binary coders, the function coder F, the character identification coder B and the width coder W, are able to receive instructions as electrical impulses concerning a character set on the main keyboard, the selected font of this character, its respective spacing and any other instruction ultimately needed. The coders then transmit such instructions as energy impulses through selected binary leads 35 from the function coder F, binary leads 36 from the character coder B and binary leads 37 from the width coder W. The leads 35, 36 and 37 interconnect with selected, specified leads 38 of an array, 15 in all, which extend to the tape perforator P and become portions of the basic perforator channel circuits, sometimes hereinafter referred to as circuits or channels x–1 through X–15. When energized by an electrical impulse, the circuits 38 will actuate the perforating mechanisms of their respective channels.

In addition to the leads 38 extending to the tape perforator P, five leads **38*a* of channels X–11 through X–15 return to the computer C. Also, other leads, not shown, extend between the perforator and the computer at stations 3 to 10 to provide end of line information to the computer. Also, lead branches 37*a*, from the width coder, extend to another portion of the computer. In the computer, the widths of the characters and spaces making up a line of composition, are totalled and indicated so that, upon completion of the line, the information as to placing and spacing the line, the justification, the quadding and the centering can be obtained. This information can then be punched into the tape, as from other signals, through closing key switches on the right-hand auxiliary keyboard R, which are transmitted through circuits, indicated as 31**, to place the necessary instructions in binary form before punching the same on the tape T.

The tape perforator P is conventional provided with fifteen channels X–1 to X–15, which are separated into three groups. The leads 38 of channels X–1 and X–2 are connected with the function coder F through circuit leads 35. The leads 38 of the eight stations X–3 through X–10 are connected with the leads 35 from the function coder F and also with leads 36 from the binary character coder B. The leads 38 of the five stations, X–11 through X–15, are connected with the leads 37 of the binary width coder.

The conventional leads of each perforator circuit X are shown in light lines at FIGS. 2, 3, 4 and 7, and certain circuits, or portions of circuits, which are not used in the present invention, are shown as terminating as plugs and are not described herein. For each circuit or channel X, each respective binary wire 38, shown at FIG. 1, is connected to a plug 38', and the lead therefrom is connected to the grid 39 of an electron tube E. Hence, whenever the binary wire 38 has a voltage impressed upon it, as by closing a key switch, such voltage will give a positive pulse to the grid 39. In further detail, the tube circuitry, FIG. 4, of channel X–1 commencing at plug 38' includes a coupling condenser 40, a grid resistor 41 and a bias resistor 42 which is connected to a lead 43 having a negative voltage source. The tube circuitry of channels X–2 to X–15, FIGS. 2, 3, 4 and 7, and commencing with plug 38', includes a coupling condenser 40, a grid resistor 41, a diode 44 and bias resistors 42 which are connected to the negative voltage lead 43. The negative-biased lead 43, having resistors 42 and a negative voltage source V, is reduced by a potentiometer 45, FIG. 4. This reduced voltage holds the tubes at an off state until a pulse is applied to a binary wire 38.

The plate circuit 49 of each tube includes a resistor 50 and the perforator solenoid 51. The circuit is completed by connecting the solenoid to a power supply lead 52 having a voltage source V. The cathode 53 of the tube is grounded by a lead 54. Accordingly, the plate circuit and the ground lead combine to become a perforator actuator lead. In this arrangement shown, a voltage pulse to the grid circuit from the binary wire 38 permits a flow of current through circuit 49 sufficient to energize solenoid 51 for actuating the perforator.

The power supply lead 52 includes a normally closed switch **55*a* between illustrating voltage source and the first junction of lead 52 and the leads 49. This switch is operated by a solenoid 55, shown at FIG. 7, which is in a circuit 56 extending to a pulser switch at the perforator, not shown. This pulser switch operates each time a perforation occurs to momentarily energize the relay solenoid 55, which, in turn, momentarily opens the switch 55*a* to break the current in the plate circuits 49, to condition the electron tubes for a subsequent pulse. Also, a blank lead 57 extends from the lead 52 between the voltage source V and the switch 55***a*. A normally open switch 55*b* is positioned in this lead and is adapted to close whenever the solenoid 55 is pulsed. In the conventional apparatus, this lead 57 and its switch 55*b* are not used, but in the present invention, it is used to actuate a stepper solenoid, as hereinafter described.

In the present invention, the conventional circuits from the keyboards and to the tape perforators may be modified by supplementary component groups of circuits which may be controlled from switches at auxiliary keyboards, as indicated at FIG. 1. Certain of these switches are of a type which may be conveniently operated by a foot pedal control A. One group of switches, for stepping and releasing signals, is generally referred to as a stepper G; another group is appropriately designated as a character cancel H. A typewriter-locking system is essential with regulating controls and circuitry provides for a typewriter lock M. Certain of the supplementary groups control discrepancies in the width units, including a perforator cancel N and a width breakdown detector Q. This latter unit will be described first.

THE WIDTH BREAKDOWN DETECTOR CIRCUITS

The purpose of this width breakdown detector Q is to permit a sensing and an indicating of a malfunction of the coded indications of character width as the tape is perforated. Whenever a circuit lead 25 is energized by closing a character key switch of the main keyboard K, the signal energizes both the leads 25*a* and 25*b*. The lead 25*a* extends to the binary character coder B and one or more of its leads 36 is energized to energize corresponding leads 38 of channels X–3 to X–10. Ordinarily, the coder B and the leads 36 and extensions 38 will not get out of order. On the other hand, the lead 25*b* extends to switches of the font selector S, and thence, to a decimal coder D. Circuits 32 from the decimal coder extend to the unit spacing control U and thence, circuits 34 extend to the binary width coder W. The leads 37 from this coder extend to leads 38 of channels X–11 to X–15 and also to the computer C. This circuitry includes a number of components not shown in the drawing, such as electronic tubes, neons, voltage control means, font selector switches, contacts of the decimal coder, and the contacts of the unit space control. Any of these components can sometimes fail to close or make contact. This failure can occur because of deposits on the switches or malfunction of the tubes or neons. Accordingly, it is possible that the character indicating channels of the tape will be perforated, but that to any width-indicating channels will not perforate. A substantial amount of composition can be lost before the operator discovers this malfunction, and he may have to reset a considerable amount of the work.

Figure 2:
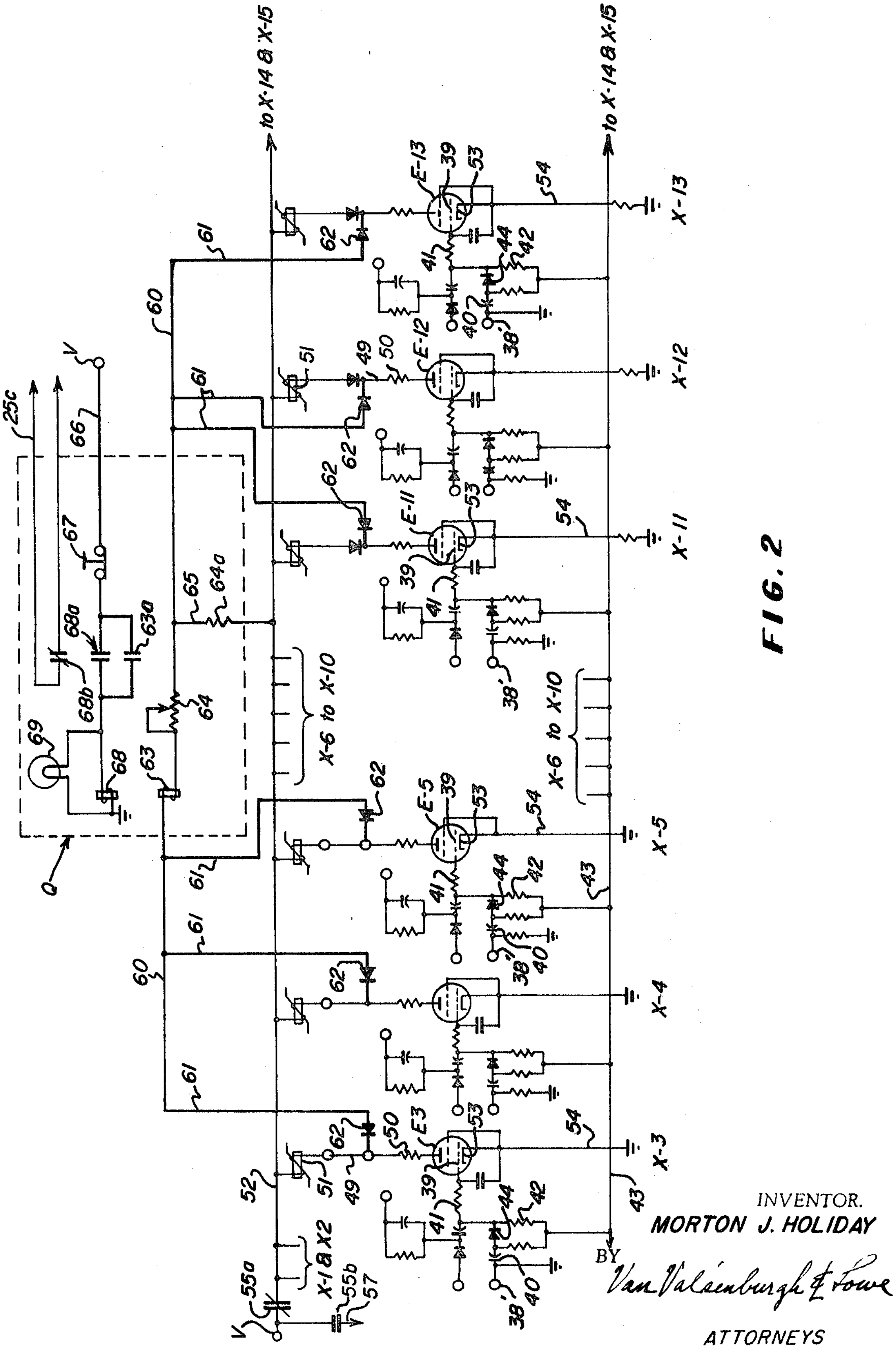
FIG. 2 is a partial circuit diagram of the tape perforator per se, and showing further, in weighted lines, an auxiliary circuit which functions to detect any failure of the line width coding circuits to function in unison with the character-coding circuits.

The circuitry of the width breakdown detector Q is interposed in the tape perforator circuits 49 to warn the operator, in the event of a signal failure of the circuits to the width indicating circuit stations X–11 to X–15. FIG. 2 illustrates the primary circuits of the width breakdown detector Q and that portion of the perforator which includes the conventional circuitry of stations X–3, X–4 and X–5 of the character binaries and stations X–11, X–12 and X–13 of the width indicator binaries. It is unnecessary to use any other stations for the detector Q, because in a conventional apparatus, at least one of the mentioned stations of each of the two groups will function for each character and for each width indication signalled to the apparatus. Accordingly, the width breakdown detector Q includes a primary lead 60, and branch leads 61 extend therefrom to each specified channel, to the plate circuits 49 between the solenoids 51 and the plate resistor 50. A directional diode 62 is interposed in each lead 61 to prevent a feedback through the other plate circuits. The three leads 61, connecting with the character channels X–3, X–4 and X–5, connect with one end of the base lead 60, while the three leads of the width indicator channels X–11, X–12 and X–13 connect with the opposite end of the base lead. The control members in the base lead between the opposite ends include a relay solenoid 63, a resistor 64 and a pickup lead 65, which connects with the power source circuit 52. To reduce the current flow as may be imposed upon the base lead 60, the lead 65 will include a resistor 64*a*.

Accordingly, whenever a tube E–3, E–4 or E–5 fires to actuate the perforator solenoid, it also imposes a drop in the potential on the base lead 60 at one side of the solenoid 63, partially grounding that end of the base lead. In normal operation, a tube E–11, E–12 or E–13 also fires, and it partially grounds the opposite end of the base lead 60. This grounding at both ends of the wire is effective to balance the system and to prevent any significant current flow through the relay solenoid 63.

When, however, the width indicator tubes do not fire properly, the current flow through lead 65, thence through lead 60, is sufficient to energize the relay 2463. This relay solenoid closes a switch 63*a* in a circuit, which is effective to warn the operator and to lock in the typewriter keys, as will now be described.

A power lead 66 extends from a suitable source V to the width breakdown detector Q. The lead 66 includes a manual reset switch 67 and extends thence to two closed branches in parallel, one having switch 63*a* and the other an interlock switch 68*a*. Extending therebeyond, the lead includes another pair of closed branches, in parallel, with one branch carrying a relay solenoid 68 and the other, a warning lamp 69. The lead 66 is thereafter grounded. Operation of this circuit is as follows: Whenever relay solenoid 63 is momentarily energized to close its switch 63*a*, the circuit 66 is momentarily energized, whereupon relay solenoid 68 registering to close its switch 68*a* to keep circuit 66 energized. Flow of current through this circuit lights the warning light 69. Also, the relay solenoid 68 operates to open another, normally closed switch 68*b*, which is in the typewriter lock circuit shown at FIG. 6, and which will be hereinafter described. The operator notes the problem by the failure of his typewriter to work and by the lighting of the warning light 69. When he has corrected the defect in the width indicating circuits, he may press the manual reset switch 67 to release the typewriter lock circuit and turn off the light 69.

CHARACTER REPEAT CIRCUITS

The necessity to repeat a character, when composing, is a frequent occurrence, and an auxiliary circuit and circuit control system to do this automatically has been found useful and desirable. The repeating of any selected character will require that the channels X–3 through X–15 be connected with auxiliary circuits which may register, retain and repeat the impulses in that group of channels which react to perforate the code of the character and its width instructions on the tape.

Figure 3:
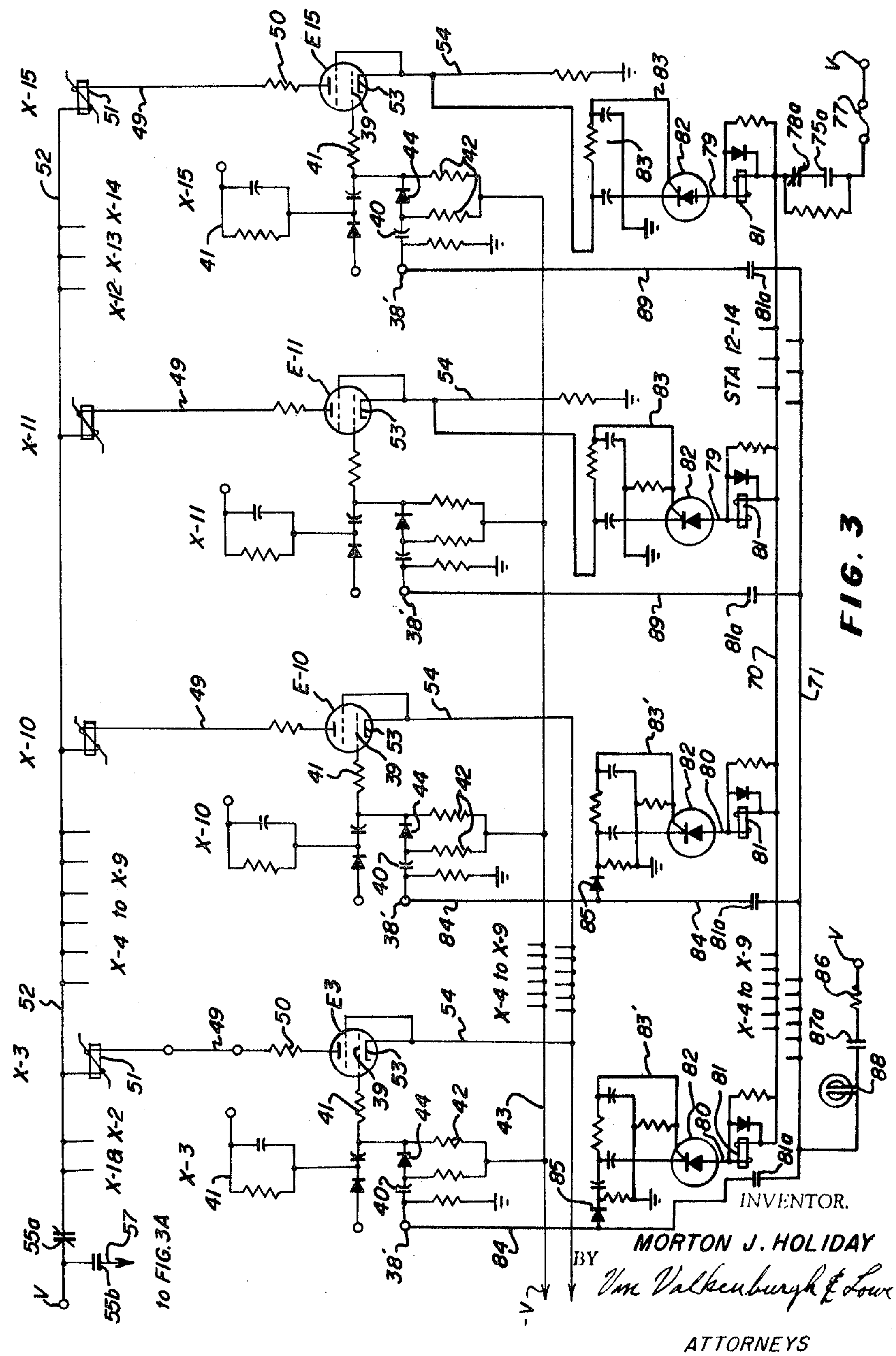
FIG. 3 is a partial circuit diagram of the tape perforator per se, and showing further, in weighted lines, an auxiliary circuit which functions in connection with other circuits to repeat the code signal of a character.

These auxiliary circuits, which may be contained in the perforator P and in the stepper G shown at FIG. 1, are illustrated in detail at FIGS. 3, 3A, 3B, 3C, 5 and 6. Referring first to FIG. 3, the primary circuit of this character repeater includes a holding circuit 70 and a pulsing circuit 71. The holding circuit 70 has a lead to each channel of the group, X–3, X–15, and when the circuit is energized, it will lock in on those specific channel circuits which are originally pulsed to code perforate the character which is to be repeated. Thereafter, the pulsing circuit will pulse the specific channel circuits the number of times the character is to be repeated. Also, the computer C will be operated to give needed spacing information as each repeat occurs, and as a precaution, the typewriter keyboard will be locked out of its circuits until the repeating is completed. Thereafter, the holding circuit releases to permit regular operation of the apparatus.

The repeats may be controlled manually by actuating a switch, or automatically by setting a stepper relay to the desired number of repeats, as hereinafter described. In either case, the operation of the character repeat is initiated by closing a preparatory circuit 72, shown at FIG. 5, and thereafter, the character to be repeated is set to commence the repeating operation. The preparatory circuit 72, conveniently located within the stepper G, consists of a lead starting from a suitable power source V and terminating at ground. A normally open switch 73 is in this lead, and another normally open switch 74 is conveniently located at the foot pedal control A (FIG. 1) to be in a lead 72a shunting the lead 72 about the switch 73, so that the circuit may be operated by closing either switch 73 or switch 74. The lead 72 also includes a normally closed, automatic stop switch 105a, which controls and stops a repeating character, or quad, when the end of a line is reached. This switch is operated by a relay solenoid 105, FIG. 3C, connected with the controlling circuit of the computer, as hereinafter described. Thence, the lead 72 extends to a relay solenoid 75 of a multiswitch relay, and thence the lead 72 extends to the ground. A signal light 76 is provided in a lead 72b shunting the lead 72 about the relay solenoid 75 to light to indicate to the operator whenever the repeater is in operation.

Referring to FIG. 3, the holding circuit 70 commences at a power source V to extend through a fuse 77 through a normally open switch 75a which is closed by energizing the preparatory relay solenoid 75. Thence, the lead extends through a normally closed switch 78a. Thence, the lead 70 continues as a bus wherefrom branch leads 79 extend to channels X–11 to X–15 and branch leads 80 extends to the channels X–3 to X–10. Each branch lead 79 extends to a relay solenoid 81, thence to a silicon control rectifier 82 and thence to ground. The gate of the rectifier is connected to a trigger circuit lead 83 which extends from the cathode lead 54 of the electron tube E.

Each branch lead 80 of channels X–3 to X–10 extends to a relay solenoid 81; thence to a silicon control rectifier 82 and thence to ground. The gate of the rectifier is connected to a trigger circuit lead 83′ which extends from a lead 84 from the channel plug 38′. A diode 85 is placed in the circuit from the lead 83′ to prevent a feedback into the lead 84.

The energizing of the plate and cathode circuit 49 and 54 of an electron tube E in any of the circuits X–11 to X–15 will trigger the silicon control rectifier 82 in the circuit 79, and the rectifier will then be conductive as long as a potential from the holding circuit 70 is upon it. Such a potential is provided by closing the switch 75a in the circuit 70. The operation of the components of channels X–3 to X–10 is similar. A pulse from a lead 38′ to the grid 39 will impose a pulse on the branch lead 84 which goes through diode 85 to render the silicon control rectifier 82 of the channel also conductive. Accordingly, the holding circuits of selected coded groups of both sets of channels are set into action after a potential is imposed on the lead 70 and a character or quad space is struck or set, triggering the proper channels in the group X–3 to X–15 through their binary leads 38′. Thereafter, the coded symbol pulsed through the binary leads will be held in the channels by a current flow through the silicon control rectifiers 82.

Each relay solenoid 81 in the leads 79 and 80, through which current is flowing, will be energized to close a switch 81a in leads of the pulsing circuit 71, as will now be described. This pulsing circuit commences at a voltage source V to extend through a resistor 86, a normally open pulser switch 87a and a neon tube 88. Thence, the lead 71 extends as a bus to connect with branch leads 89 of channels X–11 to X–15, and the leads 84 of channels X–3 to X–10. Each lead 89 and 84 extends from the bus lead 71 to each connective point 38′ of channels X–3 to X–15, and each of these leads includes a normally open switch 81a operable by the relay solenoid 81 heretofore mentioned.

Figures 3A, 3B, 3C:
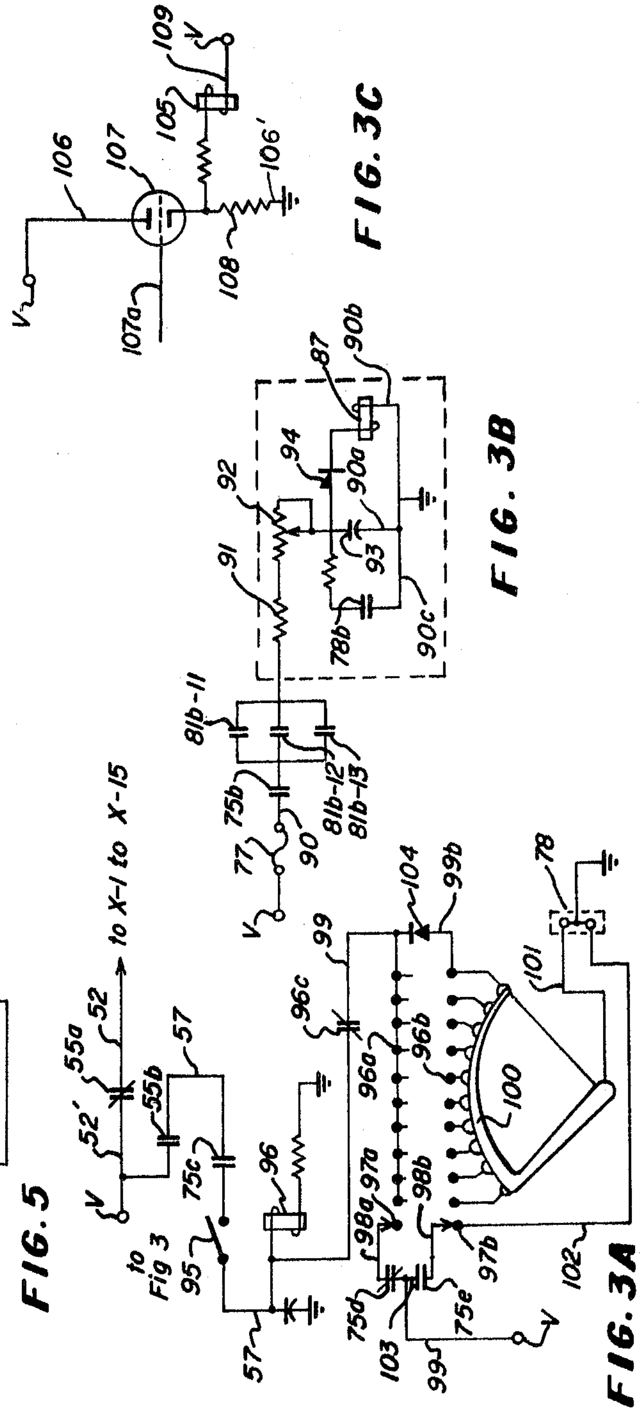
FIG. 3A is a circuit diagram of a stepper circuit which may be used in connection with the auxiliary circuit illustrated at FIG. 3.
FIG. 3B is a circuit diagram of a pulsing generator used in connection with the auxiliary circuit illustrated at FIG. 3.
FIG. 3C is a circuit diagram of a portion of the end-of-line indicator circuit in the conventional computer circuit, showing further an auxiliary circuit used to terminate code repeats when an end of the line is reached.

Whenever the hand switch 73 or foot switch 74 closes to energize relay solenoid 75 (FIG. 5), the relay solenoid also closes a normally open relay switch 75b in a pulsing generator, whose circuit 90 is illustrated at FIG. 3B. This pulsing circuit 90 commences at a voltage source V, extends through a fuse 77, thence through switch 75b. The circuit then forms three branches and each branch carries a relay switch 81b operable by relay solenoids 81 of the three channels X–11, X–12 and X–13 and hence, these switches are indicated as 81b–11, 81b–12 and 81b–13 at FIG. 3B. Thence, the branches reconnect and the circuit 90 extends through a fixed resistor 91 and a variable time adjuster resistor 92. Thence, the circuit forms three branches and, thence, to ground. The first branch 90a includes a capacitor 93 which is adapted to slowly charge to a selected voltage at a rate recorded by the resistors 91 and 92. The second branch 90b includes a four-layer diode 94 which is effective to release the current and discharge the capacitor 93, once a specified voltage has been attained on the capacitor, and a relay solenoid 87 which will close the switch 87a in the circuit 71, when the diode 94 releases current. The third branch 90c includes a normally open relay switch 78b, and whenever this switch is closed, the current flows through this branch to ground, to discharge the capacitor. Therefore, whenever the relay solenoid 75 is energized to close switch 75a of the holding circuit 70, it also effects the closure of switch 75b.

Whenever a character or quad is set at the keyboard, at least one of the channels X–11, X–12 or X–13 will be energized by pulsing instructions of the character or quad to be repeated, to activate its solenoid 81 and close at least one of the switches 81b–11, 81b–12 or 81b–13. A charge then builds up on condenser 93 which periodically discharges through diode 94 to pulse relay solenoid 87. The pulsing of the circuit 90, illustrated at FIG. 3B, is effective to open and close switch 87a of the pulsing circuit 71 and will continue to do so as long as the holding circuit 70 is closed. The operator can follow this pulsing sequence and terminate it manually, for when he opens switch 73 or switch 74 to open circuit 72 (FIG. 5), the switch 75a also opens to deenergize circuit 70 and, at the same time, the switch 75b opens to stop the pulsing and switch 78b momentarily closes to discharge the condenser, as will be described.

The lead 57 from the power supply line 52 extends to a stepper control, which is now described. This control includes: a normally open switch 75c, closed by the relay solenoid 75 of the preparatory circuit 72; a manually operated, normally closed switch 95 which may be opened to disconnect stepper for manual pulsing; a stepper solenoid 96 and thence to ground. The stepper, a conventional, continuously stepping type, as two banks of contacts, 96a and 96b, each bank including a home contact 97a and 97b, respectively. The stepper arms 98a and 98b, normally remain on home contacts but move in unison across the stepper contacts responsive to pulsing of solenoid 96.

The bank of contacts 96a is used to return the arms to their home contacts, and the contacts 96a are connected together by a portion of a circuit lead 99 which extends to a normally closed interrupter switch 96c, and thence to junction with lead 57 adjacent to solenoid 96. The other portion of this lead 99 commences at a power source V, thence through a normally closed switch 75d and thence to the stepper arm 98a.

Whenever the relay solenoid 75, heretofore described, is not energized, should the stepper arm 98a be on any contact other than the home contact 97a, the circuit 57 will be open, and the circuit 99 will be closed, and the interaction between switch 96c and stepper solenoid 96 will cause the arms to step until they again reach the home contact 97a. Then the circuit 99 is open, stopping all action. Whenever the relay 75 is energized by closing a switch 73 or 74 to initiate stepping operations, switch 75d opens to render the circuit 99 inoperative, while switch 75c closes to permit stepping to occur by pulsing of the circuit 57 responsive to the action of the perforator.

The other bank of contacts 96b is used to establish a selected number of pulses. The stepper includes a contacting shorting selector switch 100 which is shifted to move off a selected number of stepper contacts of the group 96b. A portion of a circuit lead 101 connects with the selector switch and extends to one side of a magnetically held relay solenoid 78 and thence to ground. A portion of a parallel circuit lead 102 extends from the stepper home contact 97b and to the other side of the magnetically held relay solenoid 78, and thence to ground. Either lead 101 or lead 102 is completed by a lead 103 joining with lead 99 adjacent to the power source, and lead 103 includes a normally open switch 75*e* and connects with the stepper arm 98*b*. To complete this arrangement, the final stepper contact 96*b* includes a lead 99*b* connecting with a lead 99, but with a diode 104 therein to prevent a feedback from improperly operating relay solenoid 78 whenever bank 96*a* is in operation.

Operation of this bank of contacts 96*b* and its associated leads is as follows. At the beginning of a repeat operation, the stepper arms 98*a* and 98*b* will be at their home contacts 97*a* and 97*b*. The selector switch is then set for a desired number of repeats, within the capacity of the stepper, and when either switch 73 or 74 is closed to energize relay solenoid 75, switch 75*e* closes to energize circuit 102. This would normally throw relay solenoid 78 to a first position, but the relay solenoid will already be at that position from a previous operation, because this relay solenoid 78 is magnetically held. After the stepper arm leaves the home contact 97*b*, it opens circuit 102. Stepping then proceeds by pulsing of circuit 57 operating solenoid 96 until the arm 98*b* connects with the contact whereon the selector switch 100 is set. This energizes circuit lead 101 to throw the relay solenoid 78 to an off position, which, in turn, opens switch 78*a* to deenergize the holding circuit 70 and closes switch 78*b* to discharge the condenser of the pulsing circuit 90. At the same time, a current through the switch 100 to lead 99*b* operates solenoid 96 through interrupter switch 96*c*, causing the stepper to return to its home position, should switch 75*d* of circuit 99 through the bank 96*a* be open. When the stepper 98*b* returns to home position, the circuit 102 is energized to throw the relay solenoid 78 to the initial position to close switch 78*a* and to open switch 78*b*.

The pulsing of the pulsing circuit can be controlled manually by opening the normally closed, manually operated switch 95 in the lead 57. Ordinarily, the pulses and repeat perforations will proceed so fast that such are impossible to control precisely, especially when it is desirable to stop the repeats at the end of a line. This is accomplished by the opening of the switch 105*a* in the preparatory circuit 72, FIG. 5, by a relay 105 in circuits controlling the end of the count of the computer. FIG. 3C shows a fragment of the circuits within the counter computer which operates switch 105*a* at the end of the line. A voltage source V provides a potential on a circuit 106 which connects with the plate of a tube 107. The cathode continues this lead as 106' to ground, with a resistor 108 therein. The grid of tube 107 is normally charged by a circuit 107*a*, so that the tube is conducting, but in a conventional apparatus, this charge is removed to cut the tube off, when the end of the line is reached. To this conventional circuit, an auxiliary lead 109 extends from a voltage source V to the lead 106' and includes a relay solenoid 105. When conducting, the tube 107 does not permit a significant current flow through solenoid 105, but when the tube cuts off, the current flow through solenoid 105 is sufficient to actuate switch 105*a*.

The typewriter-locking means is accomplished when the first character or quad is set and one or more of the relay solenoids 81 at stations X–11, X–12 and X–13 are energized through the use of switches designated 81*c*–11, 81*c*–12 and 81*c*–13 at the circuit diagram illustrated at FIG. 6, hereinafter further described.

CHARACTER CANCEL CIRCUIT

It is often desirable to compose a line or a portion of a line, using characters, with the spacing instruction codes being perforated on the tape, but with no perforations of the character codes. This useful for indentation or for spacing using special widths based upon various characters.

Figure 5:
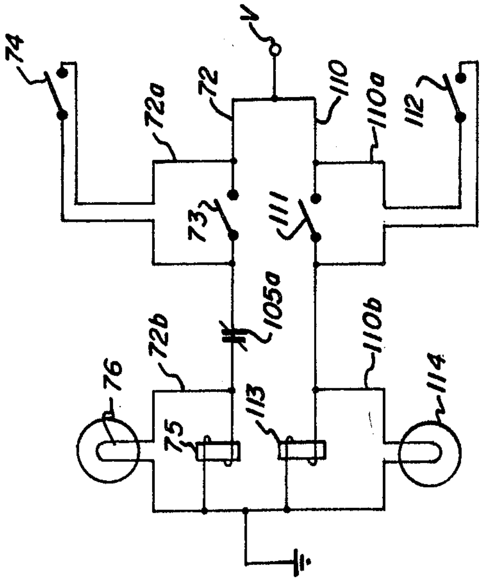
FIG. 5 is a circuit diagram of a combined switching arrangement for control of both the stepping character repeater of FIGS. 3 and 3A and for the character cancel of FIG. 4.
Figure 4:
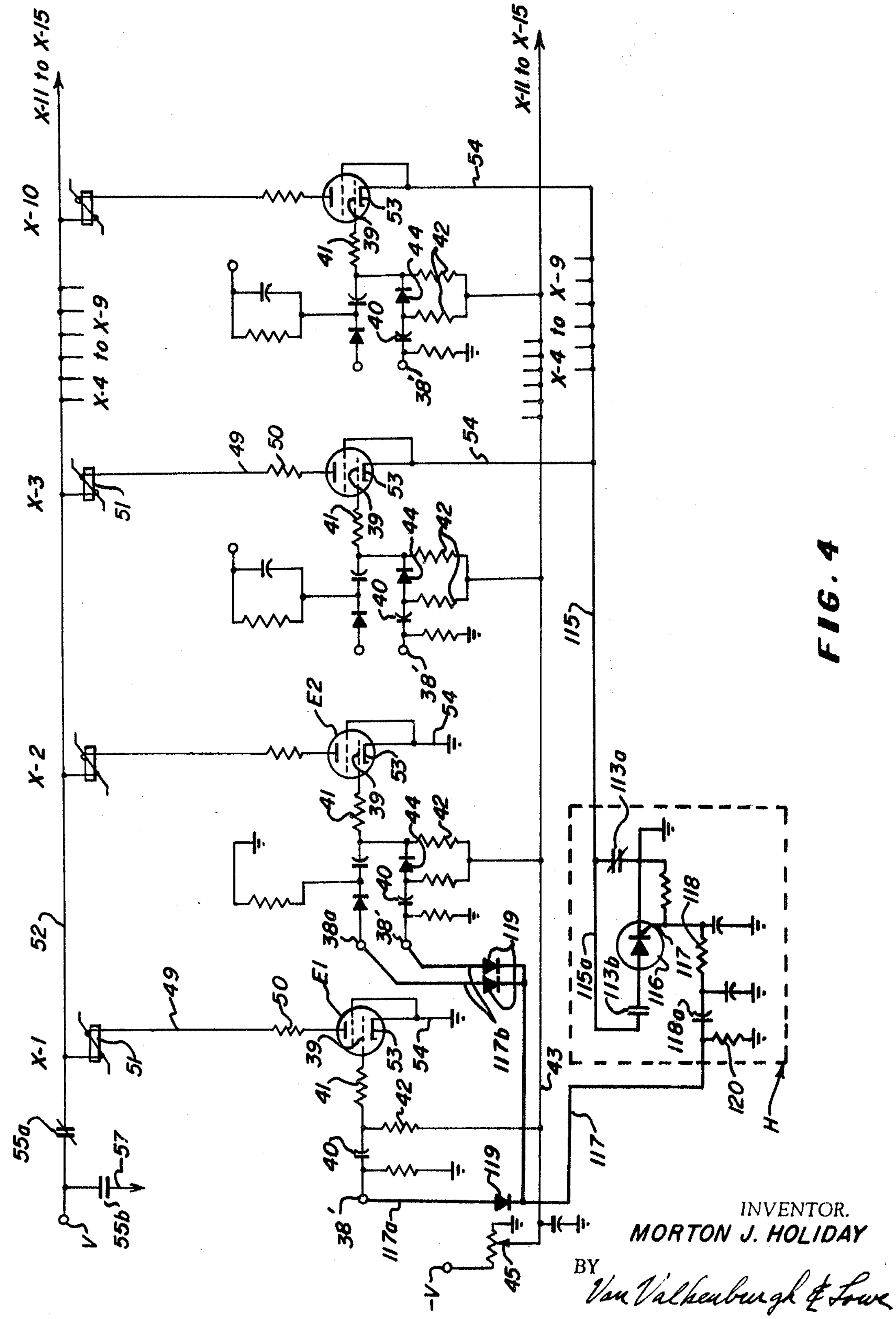
FIG. 4 is a partial circuit diagram of the tape perforator per se, and showing further, in weighted lines, an auxiliary circuit which functions to cancel the code signal of a character.

Auxiliary circuit to effect the character cancel are illustrated at FIGS. 4 and 5. FIG. 4 shows the circuit at the perforator which is associated with channels X–1 to X–10, and FIG. 5 shows the preparatory circuit for initiating operation of the same. Referring first to FIG. 5, the preparatory circuit 110 includes a lead starting at a power source V. A normally open switch 111 is in this lead, and a normally open foot pedal switch 112 is in a lead 110*a*, shunting the lead 110 about the switch 111, so that either switch may be used. Thence, the lead extends to a relay solenoid 113 of a multiswitch relay and thence to ground. A signal light 114 is provided in a lead 110*b*, shunting lead 110 about the solenoid 113 to a light 114, to indicate to the operator that the character cancel is in operation.

Referring to FIG. 4, the ground leads 54 of the plate circuits of the tubes E–3 to E–10 are connected into a common lead 115 which extends to the character cancel control H. Thus, this lead passes through a normally closed switch 113*a* and thence to ground. Another branch 115*a* of lead 115 extends to a normally open switch 113*b*, thence to a silicon control rectifier 116 and thence, to ground. Whenever the solenoid 113 is energized by closing a switch 111 or 112 (FIG. 5), the switch 113*a* is opened to break ground and the switch 113*b* closes to put a voltage on the rectifier 116. However, this rectifier will not provide a normally closed circuit leading to a ground for the cathodes of the tubes E–3 to E–10 and thus, the resulting open circuit prevents them from conducting, and the perforator solenoids of channels X–3 to X–10 will not activate their perforators for character codes, even though potential signals are applied to grids 39. As long as the switch 111 or 112 of the preparatory circuit remains closed, the character codes are omitted from the tape.

However, this circuit closure is automatically cancelled at the end of a line when channels X–1 and X–2 are actuated for spacing instructions. A gate lead 117 extends from the gate of the rectifier 116 through a resistor 118 and a coupling condenser 118*a* and thence to a branch 117*a*, which connects with terminal 38' of channel X–1, and branches 117*b*, which connect with leads 38' and 38*a* of channel X–2. Diodes 119 are placed in the leads 117*a* and 117*b*, and a grounded resistor 120 is connected in the lead 117 to complete the circuit. As soon as an end of the line code is perforated, the silicon control rectifier 116 will conduct and provide a ground for the cathodes of tubes E–3 to E–10. The solenoids of all of the channels X–1 to X–15 can then function to activate the perforator for end-of-line instructions. This is possible because the triggering of the silicon control rectifier 116 is much faster than the energizing of the plate circuits 49 of the tubes E. After the end-of-line instructions are perforated, the impulse is no longer in line 117, and the rectifier 116 no longer conducts; accordingly, the next line is typed without character code, and until the switch 111 or 112 is again opened, the character codes will not be perforated except for end-of-line information.

PERFORATOR CANCEL CIRCUIT

It is often desirable to type a line on the keyboard and subtract the count on the computer without actually perforating the information on the tape. For example, this will assist the operator in spacing his text and obtaining end-of-line information, without requiring the photographic printing unit to assimilate unnecessary code signals.

Figure 7:
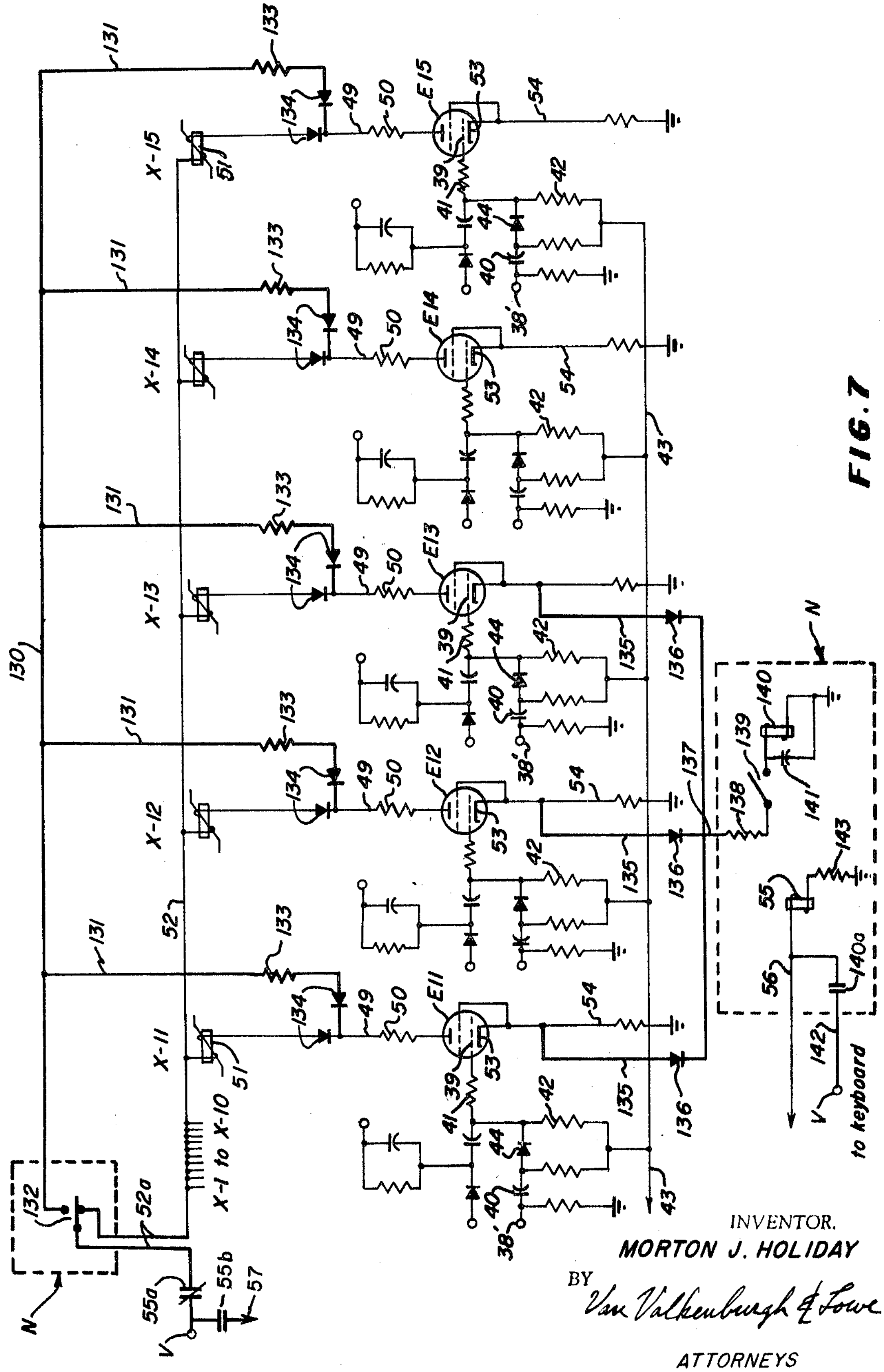
FIG. 7 is a partial circuit diagram of the tape perforator per se and showing further, in weighted lines, an auxiliary circuit which functions to completely cancel the perforator mechanism.

Auxiliary circuits to effect the perforator cancel circuits are illustrated at FIG. 7. This perforator cancel is operated by diverting the power supply through a lead 130 from the perforator solenoid power lead 52. This diversion lead 130 connects with the plate circuit leads 49 of the channels 11 to 15 by branches 131 to provide power to operate pulses coded to those channels, 11 to 15. As heretofore mentioned, these channels provide for binary coding of the character widths typed at the keyboard, and the coded signals are diverted to the perforator and also to the computer. The desired operation is to pulse the channels to operate the computer, but to not operate the perforator. On the other hand, the channels of stations 1–10 are completely disconnected and are inoperative by this diversion of power to lead 130.

To effect this diversion, the power lead 52 is provided with a loop 52a in that portion of the lead 52 between the power source V and the channels. This loop conveniently extends to the perforator cancel section N at a location convenient to the operator. A two-way, manually operated switch 132 normally closes this loop 52a to direct power through lead 52, but opens to close on line 130 to divert power to that line 130 whenever the perforator cancel commences to operate.

Each branch 131 extends to the plate circuit lead 49 of its respective channel stepping the solenoid 51 and plate of the electron tube E to pass current through that circuit 49 without energizing the solenoid 51. A resistor 133 is carried in this line to compensate for the voltage drop which would occur if the current were through the solenoid 51 and diodes 134 are carried in each of the lines 49 and 131, to prevent improper flow of current in a given line, when it is not functioning. With this arrangement, it is apparent that the channels 11 to 15 controlling the computer will be operative, excepting that perforations will not occur.

It becomes necessary, however, to discharge all of the circuits after each pulse through the lines, and a supplementary circuit, for this purpose, connects with ground leads 54 of channels 11, 12 and 13, these channels being selected since one or more of these three selected channels will always function at each perforator code signal.

A branch 135 extends from each cathode lead 54 which has a diode 136 to direct the current flow and joins with a common lead 137. Lead 137 includes a resistor 138, a manual switch 139 which is closed when the apparatus is in operation, and is on the same lever as switch 132 to operate in unison therewith. Thence, the lead 137 divides into two branches, one branch including a solenoid 140 and the other branch a capacitor 141. Thence the branches are grounded. The resistor 138 and the capacitor 141 form an RC network, to provide a delay of the action of solenoid 140 to provide adequate timing for the cutting off of tubes E–11 to E–15, to give the computer C time to register. This circuit 137 functions to momentarily energize a relay solenoid 55 which opens a switch 55a in the power lead 52 after each perforation sequence, to make sure the tubes E–1 to E–15 are fully cut off, as heretofore described. The solenoid relay 55 is in the conventional circuit lead 56, heretofore mentioned. It is also in a circuit lead 142 which, commencing from a power source V, includes a normally open switch 140a, closed when solenoid 140 is energized. The lead 142 also includes the relay 55 and a suitable resistor 143 and thence extends to ground.

TYPEWRITER LOCK AND LOCK CANCEL CIRCUIT

The typewriter keyboard K is powered from a power source V through a circuit 25c (FIG. 1). This circuit includes conventional switches which are closed when the apparatus is in operation, but which open to render the keyboard inoperative, since this power lead 25c branches to each of the switches of circuit leads 25 controlled by the keyboard. In the present invention, this lead 25c also includes normally closed switches which open to lock out the typewriter keys whenever the apparatus is not properly functioning, as described in connection with the width breakdown detector, or whenever the stepper is repeating characters.

Figure 6:
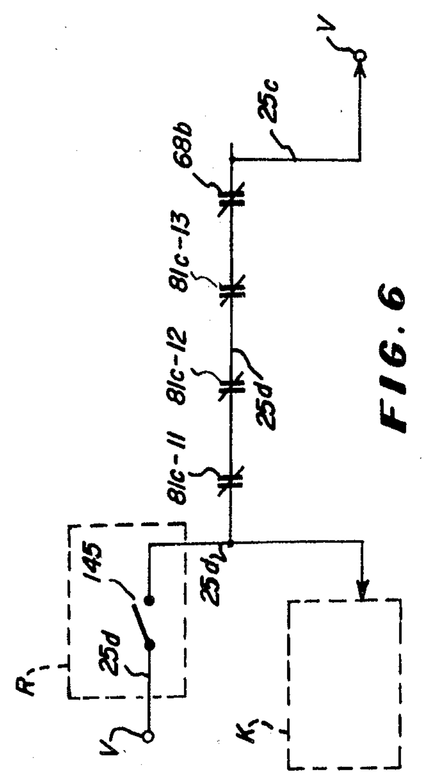
FIG. 6 is a circuit diagram of a portion of the typewriter lock circuit having additional switches therein which function articles lock the typewriter keys whenever the width detector or repeater are functioning and an auxiliary release circuit which may be used to release keys when a line is completed, as where the operator desires to add one or a few additional characters to the line.

Referring more particularly to FIG. 6 of the drawing, the circuit 25c commences with a power source V and extends thence to include a series arrangement, the normally closed switch 68b of the width breakdown detector and the normally closed switches 81c–11, 81c–12 and 81c–13 of the stepper control. Thence, the circuit 25c extends to the keyboard K. A typewriter lock cancel circuit 25d is provided, conveniently at the auxiliary keyboard R, which includes a normally open, manually operated switch 145. The circuit extends from a power source to connect with a lead 25c adjacent to the keyboard K.

LEAD CONNECTOR

Referring to FIG. 1, it is noted that the fifteen leads 38 to the perforator are joined by leads 89 from the stepper, leads 35 of the binary function coder, leads 36 of the binary character identification coder and leads 37 of the width coder, all in a somewhat complex patter. Accordingly, the present invention includes further, a simplified connector to permit all of these leads to be quickly interlocked into their proper arrangement and, if necessary, quickly and easily disconnected for maintenance of the apparatus. This connector, illustrated at FIGS. 8 through 12, is formed as a compound plug consisting of a base unit 150, an intermediate unit 151 and a cap 152. Each of these units will carry a set of leads. For example, a base unit will ordinarily carry the main leads 38, the intermediate unit may carry the leads 89 from the stepper and the cap unit may carry yet other leads, not shown. Naturally, if it becomes desirable, more than one intermediate unit may be used to provide for a separate plug for each and every set of leads. In this way, each group of leads may be connected into the apparatus at a single juncture.

The base unit 150, which will preferably carry the leads 38, is formed within a narrow, comparatively deep, rectangular, cuplike body shell 153. The lower portion of this cup is formed as an enclosed cavity to retain the leads, such as 38, and this shell includes an opening 154 at one end thereof to receive these wires. The upper portion of the cup cavity is filled by an insulating block 155 of bakelite or a similar rigid insulating material. A narrow, elongated pocket 156 is centered in this block 155 and a number of conductor strips 157 are arranged in this pocket in opposing rows. In the unit illustrated, each strip 157 extends from a bell mouth shaped entrance, where the strip is hooked into position, as at 158, and extends downwardly through the pocket to the underside of the block to project therebelow as a stub 159 within the cavity at the lower portion of the shell 153. There the leads, such as leads 38, are connected to each of the strips, as by soldering, in a proper, easily determined sequence.

Figure 8:
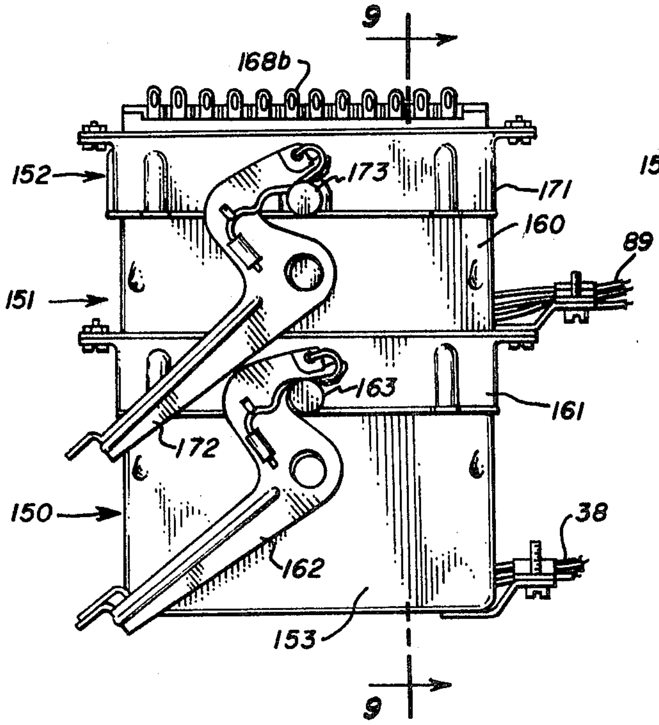
FIG. 8 is a side elevational view of an improved, composite plug arrangement for interconnecting groups of leads, such as auxiliary control leads, to the leads extending to the tape perforator.
Figure 9:
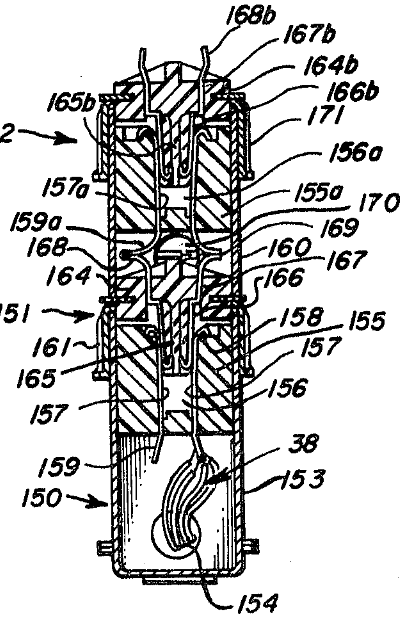
FIG. 9 is a transverse section through the composite plug, as taken from the indicated line 9–9 at FIG. 8.
Figure 11:
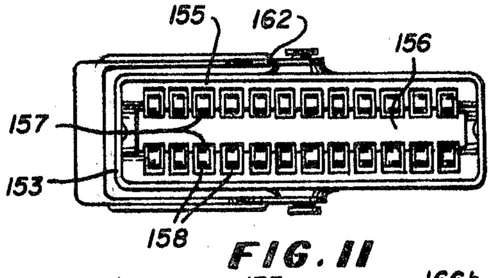
FIG. 11 is a plan view of the lower plug section.
Figure 10:
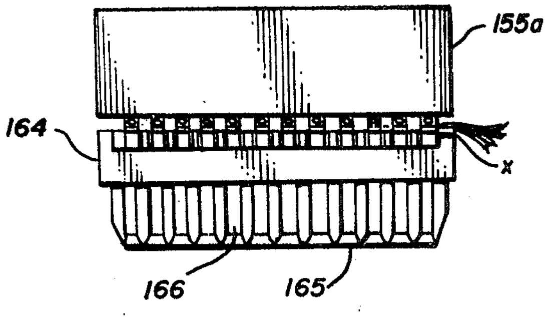
FIG. 10 is a side elevational view of the intermediate plug section of the composite unit shown at FIG. 8.
Figure 12:
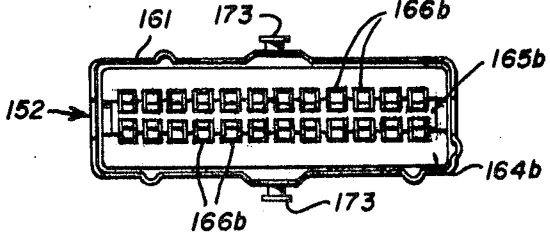
FIG. 12 is a bottom view of the top plug section.

The intermediate unit 151, which may carry another group of leads, such as a continuation of leads 38 or leads 39 or any other group, is formed similar to the cup-shaped unit of the base section 153, but within a tubular shell 160 having an open bottom portion which is flared, as at 161, to telescopically fit over the base section 153. A yoke-shaped latch 162 is mounted on the outer face of each side of the base unit 150 to connect with pins 163 at each side of the outer face of the flare 161 to secure the units together, as illustrated at FIG. 8.

The bottom section of this shell 160 is closed by an insulating block 164 having a tongue 165 which projects into the slot 156 heretofore described. This tongue carries an array of copper strips 166 which are arranged to register with and to contact the strips 157 in the slot 156 whenever the two units are interconnected, as illustrated at FIG. 14. These strips 166 project upwardly through slots 167 in the block 164 to terminate as stubs 168 upstanding from within the cavity formed by the central portion of the tubular shell 160.

The upper portion of the shell is formed by an insulating block 155a having a narrow, elongated pocket 156a, conductor strips 157a in the the same arrangement as heretofore described, and the stub ends 159a of these strips connect with the stubs 168 and are soldered thereto, as at 169, to provide for a group of strips arranged in a continuous pattern extending through the shell 160. This body shell includes a side opening 170 through which conduits may extend to be soldered to the proper stubs at the juncture point 169.

The cap 152 will carry yet other leads, and it is formed within a narrow, tubular shell 171 which is substantially the same as the enlarged, flared bottom 161 of the shell 160 and is thus adapted to slidably fit upon the top of the shell 160. A yoke-shaped latch 172 is mounted upon the outer face of the shell 160 to connect with pins 173 at the outer face of the cap 171, to secure the units together, as illustrated at FIG. 8. This cap shell 171 carries an insulating block 164b having a tongue portion 165b which projects into the slot 156a, heretofore described. This tongue carries an array of copper strips 166b which are arranged to register with and to contact the strips 157a in the slot 156a whenever the two units are interconnected, as illustrated at FIG. 14. The strips 166b project upwardly through slots 167b in the block to terminate as stubs 168b upstanding from the unit and the wires forming the selected leads are soldered to these stubs.

I have now described my invention in considerable detail. However, it is obvious that alternates and equivalents to the proposed invention are possible, and accordingly, it is to be understood that the invention shall not be limited to the constructions illustrated and described, but only by the proper scope of the appended claims.

I claim:

1. A repeating means for a tape-perforating apparatus for phototypographical machines and the like of the type which includes:

a multichannel tape perforator means;

a signal-producing means adapted to transmit signals to the channels of the tape perforator means;

a channel lead at each channel of the tape perforator means adapted to receive a signal from the signal-producing means as an electrical impulse;

a perforator actuator lead at each channel of the tape perforator means, extending from a power source to ground and including a perforator actuator solenoid; and an electronic valve means interconnecting each channel lead with its perforator actuator lead adapted to normally render the perforator actuator lead nonconductive, but to render the same conductive to energize the perforator actuator solenoid responsive to an electrical impulse signal in the channel lead, and wherein said repeating means is adapted to actuate to repeatedly render a perforator actuator lead conductive once a signal is received at the lead and comprising:

a. a holding lead having a normally open switch adapted to be closed to energize the lead when the repeating means is to be actuated and a holding branch extends from the holding lead to each channel of the group, each holding branch includes an actuator solenoid means and a normally off electronic gating means, each gating means has a trigger lead adapted to turn on and lock on the gating means when subjected to a potential from the holding branch and thereafter subjected to an impulse from the trigger lead, whereby, when said holding lead and the holding branches are subjected to a potential by closing the switch, a signal to a selected channel will impulse its trigger lead and turn on the electronic gate means at the selected channel so that the holding branch of the selected channel will be energized and the actuator solenoid in the holding branch will be energized; and b. a pulsing means having a pulsing lead adapted to be pulsed by the pulsing means and a pulsing branch extends from the pulsing lead to each channel of the group, a normally open switch in the pulsing branch of each channel is adapted to be closed responsive to energizing the actuator solenoid means of the channel, whereby the channel, wherein the holding branch is energized to close the switch of the pulsing branch, will be pulsed to cause its perforator actuator to perforate with each pulse as long as the aforesaid holding lead is energized and, accordingly, repeat the perforations of a given character and spacing signal.

2. In the apparatus defined in claim 1, wherein said pulsing means includes a circuit having a condenser and an electronic gate means adapted to permit a discharge therefrom whenever a selected charge is built upon the condenser and a solenoid adapted to be energized from the discharge from the condenser, and said pulsing lead includes a normally open switch adapted to be closed whenever the solenoid is energized.

3. In the organization defined in claim 1, including a counter means operative responsive to the pulsing of the pulsing means to step one step for each pulse;

selector means having a contact adapted to be closed after a selected number of steps;

a means for initiating the stepper means, simultaneously with the initiation of the pulsing means; and a means associated with said selector contact to stop the pulsing means.

4. In a tape-perforating apparatus for phototypographical machines and the like, which includes:

a multichannel tape perforator means to perforate a tape in a coded manner to represent specific symbols;

a signal-producing means adapted to transmit signals to the channels of the tape perforator means and to transmit signals representing a specific symbol to selected channels thereof;

a channel circuit means including a channel lead at each channel of the tape perforator means adapted to receive a signal from the signal-producing means as an electrical impulse;

a perforator actuator lead at each channel of the tape perforator means extending from a power source to ground and including a perforator actuator solenoid; and an electronic valve means at each channel interconnecting the channel lead with the perforator actuator lead of the channel normally rendering the perforator actuator lead nonconductive, but rendering the same momentarily conductive to energize the perforator actuator solenoid responsive to an electrical impulse signal in the channel lead;

the improvement comprising:

a repeating means adapted to repeatedly render momentarily conductive the perforator actuator lead of selected channels representing a specific symbol to thereby repeatedly energize the perforator actuator solenoids of such selected channels once the signal producing means transmits a signal to the selected channels; and including:

a. a holding means having a branch extending to each channel and means adapted to activate the holding means whenever a signal is to be repeated;

b. a gating means at each channel operative responsive to a transmitted signal to the channel to lock in the holding means once the holding means is activated, whereby the holding means of the aforesaid selected channels are locked in, responsive to a signal and remain locked in as long as the holding means are activated;

c. a pulsing means extending to each channel circuit means adapted to repeatedly transmit pulse signals to the circuit means; and d. a normally off gate means preventing the pulsing means from signalling the gate means being adapted to be turned on by the holding means whenever the holding means is locked in, whereby the pulsing means will repeatedly energize the perforator actuator solenoid.

5. In a tape-perforating apparatus for phototypographical machines and the like, which includes:

a multichannel tape perforator means to perforate a tape in a coded manner to represent specific symbols;

a signal-producing means adapted to transmit signals to the channels of the tape perforator means and to transmit signals representing a specific symbol to selected channels thereof;

a channel circuit means including a channel lead at each channel of the tape perforator means adapted to receive a signal from the signal producing means as an electrical impulse;

a perforator actuator lead at each channel of the tape perforator means extending from a power source to ground and including a perforator actuator solenoid; and an electronic valve means at each channel interconnecting the channel lead with the perforator actuator lead of the channel normally rendering the perforator actuator lead nonconductive, but rendering the same momentarily conductive to energize the perforator actuator solenoid responsive to an electrical impulse signal in the channel lead;

the improvement comprising:

a repeating means adapted to repeatedly render momentarily conductive the perforator actuator lead of selected channels representing a specific symbol to thereby repeatedly energize the perforator actuator solenoids of such selected channels once the signal producing means transmits a signal to the selected channels; and including:

a. a holding lead having a branch extending to each channel and a normally open switch means adapted to be closed to energize said holding lead whenever a signal is to be repeated;

b. a normally off gating means at each branch of the holding lead having a trigger lead connecting with the channel circuit means thereof, said trigger leads at the selected channel being adapted to turn on the gating means of the channels whenever the holding leads are energized and the channel circuit means are momentarily energized by the signal producing means, and said gating means being adapted to remain on as long as the holding leads are energized, whereby the gating means at each of the aforesaid selected channels will be on responsive to closing the holding lead switch means and receiving a signal from the signal means;

c. a pulsing means including a pulsing lead extending from the pulsing means and having a branch extending to each of the channel circuit means;

d. a normally off pulsing gate means at each branch of the pulsing lead adapted to normally prevent pulses from reaching the channel circuit means of the branch; and c. means at each holding lead branch adapted to turn on the pulsing gate means of the corresponding branch whenever the gating means of the holding branch is on, whereby to permit pulses to be directed to the channel circuit means of the selected channels to repeatedly actuate the corresponding perforator solenoids.

6. In the apparatus defined in claim 5, wherein:

the trigger lead of the holding lead gating means is connected to the perforator actuator lead of the channel circuit means;

each branch of the pulsing gate lead includes said normally off gate means; and a solenoid in the corresponding holding lead means is adapted to be energized to turn on the said normally off gate means.

7. In the apparatus defined in claim 5, wherein the pulsing means includes:

a circuit having a condensor and an electrical gate means adapted to permit a discharge therefrom whenever a selected charge is built upon the condenser; and a solenoid adapted to be energized responsive to the discharge of the condenser.

8. In the organization defined in claim 5, including:

a counter means operative responsive to the pulsing of the pulse means;

the selector means having a contact adapted to be closed after a selected number of pulses;

a means for initiating the counter means simultaneously with the initiation of the pulsing means; and a means associated with said selector means to stop the pulsing means.

UNITED STATES PATENT OFFICE

CERTIFICATE OF CORRECTION

Patent No. 3,595,471 July 27, 1971

MORTON JACK HOLIDAY

It is certified that error appears in the above identified patent and that said Letters Patent are hereby corrected as shown below:

Column 2, line 9, "workday" should read -- a line --; line 21, "be" should read -- novel --; line 61, "articles" should read -- to --. Column 3, line 51, "code" should read -- coder --. Column 5, line 50, "to any" should read -- the --. Column 6, line 18, "relay 2463" should read -- relay solenoid 63 --. Column 7, line 48, "the" should read -- that --. Column 8, line 44, "as" should read -- has --. Column 9, line 70, -- is -- should be inserted after "codes. This".

Signed and sealed this 23rd day of May 1972.

(SEAL)
Attest:

EDWARD M.FLETCHER,JR.
Attesting Officer

ROBERT GOTTSCHALK
Commissioner of Patents